UNITED STATES PATENT OFFICE 2,153,931

PRODUCTION OF PHOTOGRAPHIC SENSITIZING COMPOUNDS

Mark Barent and John David Kendall, Ilford, England, assignors to Ilford Limited, Ilford, England, a British company No Drawing. Application March 31, 1937, Serial No. 134,182. In Great Britain April 6, 1936

2 Claims. (Cl. 260—240)

This invention relates to the production of photographic sensitizing compounds.

The most important known photographic sensitizing compounds are the cyanine and carbocyanine dyestuffs which contain two heterocyclic nitrogen nuclei linked by a methine or polymethine chain, and it is a feature of all these compounds that the nitrogen atom in one nucleus is trivalent and the nitrogen atom in the other nucleus is quinquevalent. There are many known methods for producing cyanine and carbocyanine dyes, and in general these methods consist essentially in the condensation of quaternary salts of heterocyclic nitrogen compounds. One known method consists in the condensation of a quaternary salt of a heterocyclic nitrogen compound having a reactive methyl grouping in the $\alpha$ or $\gamma$ position to the nitrogen atom with a quaternary salt of a heterocyclic nitrogen compound containing a reactive thioether or selenoether grouping (including the reactive grouping of an alkyl salt of a N-alkyl thione or selenone) or an amino- or substituted amino-vinyl grouping, such as an acetanilido-vinyl grouping.

We have now found that compounds which may be considered as the bases corresponding to the cyanine and carbocyanine dyestuffs may be produced by adopting a process similar to the process mentioned above for the production of the dyestuffs, but substituting for the alkyl salt of a heterocyclic nitrogen compound having a reactive methyl grouping in the $\alpha$ or $\gamma$ position to the nitrogen atom a quinoline base having a reactive methyl group in the $\alpha$ or $\gamma$ position to the nitrogen atom. Examples of suitable quinoline bases are quinaldine, lepidine, naphthoquinaldine, naphtholepidine and the corresponding compounds containing alkyl, alkoxy, alkylthiol and amino substituents.

According to the present invention a process for the production of compounds which may be considered as the bases corresponding to the cyanine and carbocyanine dyestuffs comprises condensing a quinoline base having a reactive methyl group in the $\alpha$ or $\gamma$ position to the nitrogen with a quaternary salt of a heterocyclic nitrogen compound having a reactive thioether or selenoether grouping (including the reactive grouping of an alkyl salt of a N-alkyl thione or selenone) or an amino- or substituted aminovinyl grouping (including an arylamino-, acylamino-, or acylarylamino-vinyl grouping) in the $\alpha$ or $\gamma$ position to the nitrogen atom.

The reactions involving a thioether or selenoether grouping yield bases corresponding to the cyanine dyes whilst those involving the use of the amino-vinyl groupings yield bases corresponding to the carbocyanine dyes.

A symmetrical compound may be obtained by condensing the quinoline base containing the reactive methyl group, with a quaternary salt of a quinoline base having one of the reactive groupings, such as thioether, selenoether and aminovinyl, indicated above; an unsymmetrical compound may be obtained by condensing the quinoline bases containing the reactive methyl group with a quaternary salt of a different heterocyclic nitrogen compound.

The heterocyclic nitrogen compounds whose alkyl salts may be condensed with the quinoline bases containing the reactive methyl groups in accordance with the present invention may be any of the compounds commonly used in the preparation of the corresponding cyanine and carbocyanine dyestuffs, for example, substituted and unsubstituted thiazoles, thiadolines, oxazoles, oxazolines, selenazoles, selenazolines, pyridines, quinolines, indolenines, and diazines, (as described in British Patent No. 425,609) e. g. pyrimidines, thiodiazoles and quinazolines, including the corresponding substituted and unsubstituted polycyclic compounds such as benzthiazoles, naphthathiazoles and anthrathiazoles.

The process of the present invention may be illustrated conveniently by the following equations:

i. The preparation of cyanine bases:

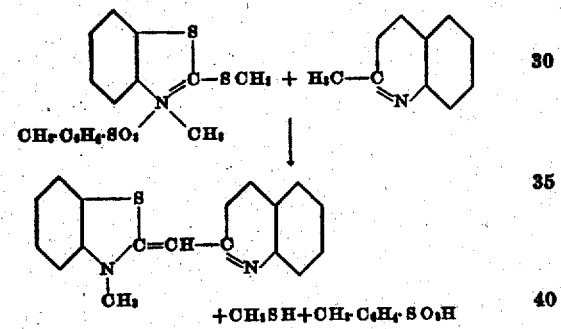

ii. The preparation of carbocyanine bases:

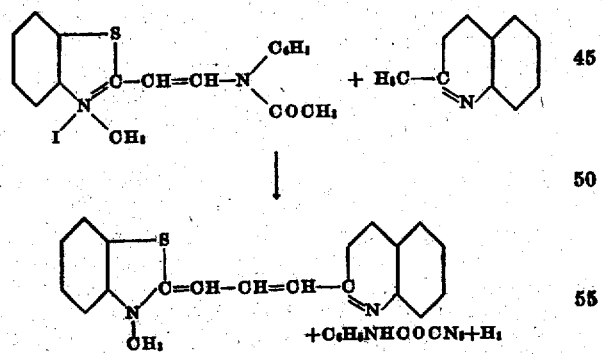

Many types of compounds may be produced in accordance with the present invention corresponding to the various types of cyanine and carbocyanine dyestuffs into which they may be converted by the addition of a molecule of an alkyl salt.

The compounds of the present invention are powerful sensitizers for silver halide photographic emulsions, in which they may be incorporated in accordance with known practice either by mixing with the emulsion prior to coating or by bathing the coated film or plate.

The manner in which the process of the present invention may be carried out in practice is illustrated by the following specific examples which are given by way of example only:

EXAMPLE I

Preparation of 2-methyldihydrobenzthiazolylidene quinaldine 3.8 grams of 1-methylthiol-benzthiazole and 3.9 grams of methyl-p-toluene sulphonate were heated together for 2½ hours at 130–140° C. 3 grams of quinaldine and 20 ccs. of pyridine were then added and the mixture was gently boiled under a reflux condenser for half an hour. The liquor was then poured into a large bulk of water when two layers formed. The aqueous layer was decanted from the oily layer, which was then stirred with spirit and ether. The solid which separated out was then filtered off from the spirit and ether and washed and recrystallised from methyl alcohol, giving yellow prismatic needles, melting at 161–162° C.

EXAMPLE II

Preparation of 1-methyldihydroquinolylidene-2:2'-quinaldine 3.5 grams of 2-methylthiol-quinoline and 3.7 grams of methyl-p-toluene sulphonate were heated together for 3½ hours at 130–140° C. 2.85 grams of quinaldine and 25 ccs. of pyridine were then added and the mixture was boiled gently under a reflux condenser for half an hour, after which it was poured into water when a residue settled out. The aqueous layer was poured off from the residue which was stirred up with spirit and filtered off and washed. The product was recrystallised from methyl alcohol to give orange prisms, melting at 153° C.

EXAMPLE III

Preparation of 2-methyldihydrobenzthiazolylidene lepidine 1.81 grams of 1-methylthiol-benzthiazole, 1.86 grams of methyl-p-toluene sulphonate were heated together for 3½ hours at 130–140° C. 1.43 grams of lepidine and 20 ccs. of pyridine were added and the mixture heated on a water bath for one hour, after which it was heated gently under a reflux condenser for twenty minutes. The mixture was then poured into water and the precipitate obtained recrystallised from dilute methyl alcohol to yield orange red needles melting at 260° C.

EXAMPLE IV

Preparation of 2-methyl-5:6-benzdihydrobenzthiazolylidene-(1)-β-naphtho-quinaldine 4.6 grams of 1-methylthiol-5:6-benzbenzthiazole and 3.7 grams of methyl-p-toluene sulphonate were heated together for five hours at 170–180° C. 3.9 grams of β-naphthoquinaldine and 50 ccs. of pyridine were then added and the mixture heated under a reflux condenser for half an hour. The mixture was then added to water and the precipitate obtained filtered off and recrystallised from methyl alcohol and benzene, giving ochre coloured crystals melting at 305° C.

EXAMPLE V

Preparation of 2-methyl-dihydrobenzoxazolylidene quinaldine 5 grams of 1-methylthiol-benzoxazole and 5.65 grams of methyl-p-toluene sulphonate were heated together for 3½ hours at 130° C. 4.2 grams of quinoldine and 25 ccs. of pyridine were then added and the mixture heated gently under a reflux condenser for twenty minutes. The mixture was then poured into water and the precipitate which formed separated out and recrystallised from methyl alcohol to give orange yellow needles, melting at 244° C.

EXAMPLE VI 2-methyl-dihydrobenzthiazolylidene-(1) - ethylidene quinaldine 8.72 grams of 1-ω-acetanilidovinylbenzthiazole methiodide and 7.5 grams of quinaldine were mixed with 50 ccs. of pyridine and the whole boiled gently under a reflux condenser for half an hour. 20 ccs. of spirit were then added and the mixture again heated for a further quarter of an hour. The mixture was then poured into water and the precipitate, which was deposited, filtered off. The precipitate was stirred with spirit and ammonia and extracted with benzene, from which brown crystals were obtained melting at 160° C.

EXAMPLE VII

1:3:3 - trimethylindolylidene - (2) - ethylidene quinaldine 4.46 grams of 1:3:3-trimethyl-2-ω-acetanilidovinyl-indoleninium iodide, 2.9 grams of quinaldine and 40 ccs. of pyridine were heated gently under a reflux condenser for half an hour, and the mixture was then poured into a mixture of ammonia and water. The aqueous liquor was decanted from the oily residue which was formed. The oily residue was then dissolved in benzene, filtered off and concentrated, and crystallised to yield brownish-yellow crystals which melted at 160° C.

EXAMPLE VIII 4.46 grams of 1.3.3-trimethyl-2-ω-acetanilidovinylindolenium iodide and 3.74 grams of 6-ethoxyquinaldine were heated together for one hour at 160° C. The mixture obtained was allowed to cool and extracted with alcohol and the solution diluted with water. Ammonia was then added and the solution extracted with benzene. The benzene solution was washed with water and dried over sodium sulphate, concentrated and triturated with ammoniacal spirit. On standing for some time a solid separated out which was recrystallized from spirit to yield brown yellow needles melting at 192° C.

EXAMPLE IX 4.46 grams of 1.3.3-trimethyl-2-ω-acetanilidovinylindolenium iodide and 3.14 grams of p-toluquinaldine were mixed together and heated at 180° C. and then maintained at a temperature of 160° C. for about ½ hour. The mixture obtained was then allowed to cool and extracted with warm alcohol. Ammonia was then added to the solution which was then extracted with benzene. The benzene solution was then washed with water and dried over sodium sulphate and afterwards concentrated. Ammoniacal spirit was then added to the concentrate and the solution allowed to stand when solid separated out. This was filtered off and recrystallized from spirit to yield shining yellow needles melting at 187° C.

EXAMPLE X 3.62 grams of 1-methylthiolbenzthiazole and 3.72 grams of methyl-p-toluenesulphonate were heated together at 130–140° C. The mass was allowed to cool and 3.14 grams of 2.4-dimethylquinoline and 30 ccs. of pyridine were added. The mixture was first warmed on a water bath for about one hour and then gently boiled under a reflux condenser for about 20 minutes and poured into water. A solid separated out and was collected and washed. The solid was then extracted with 150 ccs. of boiling benzene and filtered hot. The filtrate was concentrated and allowed to stand when the product was deposited as orange tabular crystals melting at 188° C.

EXAMPLE XI 3.7 grams of 1-methylthiolbenzthiazole and 3.75 grams of methyl-p-toluene sulphonate were heated together at 140° C. The mass was allowed to cool and 3.16 grams of 6-amino-quinaldine and 25 ccs. of pyridine were added and the whole was gently warmed for about ½ hour on a water bath and afterwards boiled gently under a reflux condenser for about ½ hour and then poured into water. A sticky deposit was formed which was dissolved up in benzene and concentrated and allowed to stand when a yellow solid, melting at 256° C. was deposited.

EXAMPLE XII

Preparation of 2-methyl-4.5-dimethoxy dihydrobenzselena-zolylidenequinaldine 2.41 grams of 1-methylthiol-4.5-dimethoxybenzselenazole and 1.56 methyl-p-toluenesulphonate were heated together at 140° C. for four hours. The mass was allowed to cool and 1.2 grams of quinaldine and 25 ccs. of pyridine were added. The mixture was warmed on a water bath for about ½ hour and then gently heated under a reflux condenser for about 20 minutes and was then poured into water and allowed to stand. A solid separated out which was filtered off and recrystallized from benzene as orange crystals melting at 233° C.

EXAMPLE XIII

Preparation of 2-methyl-4.5-methylenedioxydihydrobenzthiazolylidenequinaldine 2.25 grams of 1-methylthiol-4.5-methylenedioxybenzthiazole and 1.86 grams of methyl-p-toluene sulphonate were heated together at 140° C. for four hours. The mixture was allowed to cool and 1.43 grams of quinaldine and 15 ccs. of pyridine were added after which the mixture was first gently warmed on a water bath for about ½ hour and then gently boiled under a reflux condenser for about 20 minutes. The mixture was then poured into water when a solid separated out. This was collected and extracted with hot benzene and filtered hot. On cooling the filtrate deposited orange crystals melting at 235° C.

EXAMPLE XIV

Preparation of 2-methyl-4.5-dimethoxydihydrobenzthiazolylidenequinaldine 4.8 grams of 1-methylthiol-4.5-dimethoxybenzthiazole and 3.7 grams of methyl-p-toluenesulphonate were heated together at 140° C. for four hours. The mass was then allowed to cool and 2.86 grams of quinaldine and 25 ccs. of pyridine were added. The mixture was gently warmed on a water bath for about ½ hour and then gently boiled under a reflux condenser for a further half hour, after which it was poured into water and allowed to stand. A solid separated out which was filtered off and washed and recrystallized from benzene to yield yellow needles, melting at 226° C. to an orange red liquid.

EXAMPLE XV

Preparation of 2-methyldihydrobenzthiazolylidene-4-ethylthioquinaldine 5.43 grams of 1-methylthiolbenzthiazole and 5.58 grams of methyl-p-toluenesulphonate were heated together for 3½ hours at 130–140° C. The mixture was then allowed to cool and 5 grams of 4-ethylthiolquinaldine and 35 ccs. of pyridine were added. The mixture was first warmed on a water bath for about ¾ hour and then gently boiled under a reflux condenser for about 20 minutes after which it was poured into water and allowed to stand when a solid separated out. This was filtered off and recrystallized from benzene as yellow needles, melting at 185° C.

EXAMPLE XVI

Preparation of 2-methyldihydrobenzthiazolylidene-4-methylthiolquinaldine 5.43 grams of 1-methylthiolbenzthiazole and 5.58 grams of methyl-p-toluene-sulphonate were heated together for about 4 hours at 130–140° C. The mixture was then allowed to cool and 4 grams of 4-methylthiol quinaldine and 35 ccs. of pyridine were added. The mixture was then gently warmed on a water bath for about half an hour and afterwards gently boiled under a reflux condenser for twenty minutes, and finally poured into water and allowed to stand. A solid separated out, which was filtered off, washed and recrystallized from benzene as shimmering yellow tabular crystals, melting at 218° C.

EXAMPLE XVII

Preparation of 2-methyl-3.4-benzdihydrobenthiazolylidene-p-toluquinaldine 4.6 grams of 1-methylthiol-3.4-benz-benzthiazole and 3.7 grams of methyl-p-toluenesulphonate were heated together for five hours at about 170–180° C. The mixture was then allowed to cool and 3.15 grams of p-toluquinaldine and 50 ccs. of pyridine were added. The mixture was then gently boiled under a reflux condenser for half an hour after which it was poured into water and allowed to stand. A solid separated out which was recrystallised from benzene in the form of glistening yellow leaflets, melting at 248° C.

EXAMPLE XVIII

Preparation of 2-methyl-3.4-benzdihydrobenzthiazolylidene-quinaldine 4.85 grams of 1-methylthiol-3.4-benzbenzthiazole and 3.9 grams of methyl-p-toluene sulphonate were heated together for about 5 hours at about 170–180° C. The mixture was then allowed to cool and 3 grams of quinaldine and 50 ccs. of pyridine were added, after which the mixture was gently boiled under a reflux condenser for half an hour and then poured into water, and allowed to stand. A solid separated out which was filtered off, and extracted with hot methyl alcohol. The residue was recrystallised from benzene as glistening yellow leaflets melting at 256° C.

Example XIX

Preparation of 2-methyl-5.6-benzdihydrobenzthiazolylidene-β-naphthoquinaldine 4.6 grams of 1-methylthiol-5.6-benzbenzthiazole and 3.7 grams of methyl-p-toluenesulphonate were heated together for five hours at 170–180° C. The mixture was then allowed to cool and 3.9 grams of β-naphtho-quinaldine and 50 ccs. of pyridine were added. This mixture was then gently boiled under a reflux condenser for about half an hour and then poured into water. A solid separated out which was collected and washed and extracted with hot methyl alcohol. The residue was then recrystallised from benzene to yield ochre coloured rhombs and parallelepipeds melting at 305° C.

Example XX 4.9 grams of 1-ethylthiol-5.6-benzbenzthiazole and 4.0 grams of ethyl-p-toluenesulphonate were heated together at 150–160° C. for 4½ hours. The mixture was then allowed to cool and 2.9 grams of quinaldine and 30 ccs. of pyridine were added. The mixture was then gently boiled under a reflux condenser for about half an hour, after which it was poured into water. A solid separated out, which was filtered off, washed and dissolved in hot acetic acid. On allowing to stand a solid was deposited. This was filtered off, and the filtrate was rendered alkaline with ammonia when a solid separated out. This was filtered off, washed and recrystallised twice from spirit to yield yellow needles, melting at 186° C.

Example XXI

Preparation of 2-methyl-5.6-benzdihydrobenzthiazolylidene-quinaldine 4.85 grams of 1-methylthiol-5.6-benzbenzthiazole and 3.9 grams of methyl-p-toluenesulphonate were heated together for five hours at 170–180° C. The mixture was then allowed to cool and 3 gms. of quinaldine and 50 ccs. of pyridine added. The mixture was then gently boiled under a reflux condenser for about half an hour after which it was poured into water and allowed to stand. A solid separated out, which was filtered off, washed, and extracted with hot methyl alcohol, and the residue recrystallised from benzene as orange rhombs melting at 226° C.

Example XXII

Preparation of 2-ethyldihydrobenzthiazolylidene-quinaldine 5.0 grams of 1-ethylthiolbenzthiazole and 5.1 grams of ethyl-p-toluenesulphonate were heated together for four hours at about 130–140° C. The mixture was then allowed to cool and 3.7 grams of quinaldine and 20 ccs. of pyridine were added. The mixture was then gently boiled under a reflux condenser for about half an hour, after which it was poured into water and allowed to stand. The aqueous liquors were decanted off, and the residue was triturated with spirit and filtered. The residue was then recrystallised from methyl alcohol to yield yellow prismatic needles, melting at 137° C.

We claim:

1. A process for the preparation of bases corresponding to the cyanine and carbocyanine dyestuffs comprising heating in the presence of an acid binding substance a quinoline base containing a reactive methyl group in a position of the group consisting of α and γ positions to the nitrogen atom, with an alkyl quaternary salt of a heterocyclic nitrogen compound selected from the group consisting of alkyl quaternary salts, having one of the following groups, aminovinyl, acylaminovinyl, arylaminovinyl and acylarylaminovinyl groups substituted in the α position to the nitrogen atom and alkyl quaternary salts of heterocyclic nitrogen bases containing a pyridine ring and having one of the following groups, aminovinyl, acylaminovinyl, arylaminovinyl, and acylarylaminovinyl groups substituted in the γ position to the nitrogen atom.

2. The preparation of 1:3:3-trimethylindolylidene-(2)-ethylidenequinaldine by heating 1:-3:3-trimethyl-2-ω-acetanilidovinyl-indoleninium iodide with quinaldine in the presence of an acid binding substance.

MARK BARENT.
JOHN DAVID KENDALL.

---

CERTIFICATE OF CORRECTION.

Patent No. 2,153,931.                                      April 11, 1939.

MARK BARENT, ET AL.

It is hereby certified that error appears in the printed specification of the above numbered patent requiring correction as follows: Page 1, second column, line 16, for "thiadolines" read thiazolines; line 56, at the bottom of the formula, for "+$C_6H_5NHCOCN_3+H_1$" read +$C_6H_5NHCOCH_3+H_1$ ; and that the said Letters Patent should be read with this correction therein that the same may conform to the record of the case in the Patent Office.

Signed and sealed this 13th day of June, A. D. 1939.

Henry Van Arsdale (Seal)                                            Acting Commissioner of Patents.

EXAMPLE XIX

Preparation of 2-methyl-5,6-benzdihydrobenzthiazolylidene-β-naphthoquinaldine.

4.6 grams of 1-methylthiol-5,6-benzbenzthiazole and 3.7 grams of methyl-p-toluenesulphonate were heated together for five hours at 170–180° C. The mixture was then allowed to cool and 3.9 grams of β-naphtho-quinaldine and 50 ccs. of pyridine were added. This mixture was then gently boiled under a reflux condenser for about half an hour and then poured into water. A solid separated out which was collected and washed and extracted with hot methyl alcohol. The residue was then recrystallised from benzene to yield ochre coloured rhombs and parallelepipeds melting at 305° C.

EXAMPLE XX 4.9 grams of 1-ethylthiol-5,6-benzbenzthiazole and 4.0 grams of ethyl-p-toluenesulphonate were heated together at 150–160° C. for 4½ hours. The mixture was then allowed to cool and 2.9 grams of quinaldine and 30 ccs. of pyridine were added. The mixture was then gently boiled under a reflux condenser for about half an hour, after which it was poured into water. A solid separated out, which was filtered off, washed and dissolved in hot acetic acid. On allowing to stand a solid was deposited. This was filtered off, and the filtrate was rendered alkaline with ammonia when a solid separated out. This was filtered off, washed and recrystallised twice from spirit to yield yellow needles, melting at 186° C.

EXAMPLE XXI

Preparation of 2-methyl-5,6-benzdihydrobenzthiazolylidene-quinaldine 4.85 grams of 1-methylthiol-5,6-benzbenzthiazole and 3.9 grams of methyl-p-toluenesulphonate were heated together for five hours at 170–180° C. The mixture was then allowed to cool and 3 gms. of quinaldine and 50 ccs. of pyridine added. The mixture was then gently boiled under a reflux condenser for about half an hour after which it was poured into water and allowed to stand. A solid separated out, which was filtered off, washed, and extracted with hot methyl alcohol, and the residue recrystallised from benzene as orange rhombs melting at 226° C.

EXAMPLE XXII

Preparation of 2-ethyldihydrobenzthiazolylidene-quinaldine 5.0 grams of 1-ethylthiolbenzthiazole and 5.1 grams of ethyl-p-toluenesulphonate were heated together for four hours at about 130–140° C. The mixture was then allowed to cool and 3.7 grams of quinaldine and 20 ccs. of pyridine were added. The mixture was then gently boiled under a reflux condenser for about half an hour, after which it was poured into water and allowed to stand. The aqueous liquors were decanted off, and the residue was triturated with spirit and filtered. The residue was then recrystallised from methyl alcohol to yield yellow prismatic needles, melting at 137° C.

We claim:

1. A process for the preparation of bases corresponding to the cyanine and carbocyanine dyestuffs comprising heating in the presence of an acid binding substance a quinoline base containing a reactive methyl group in a position of the group consisting of α and γ positions to the nitrogen atom, with an alkyl quaternary salt of a heterocyclic nitrogen compound selected from the group consisting of alkyl quaternary salts, having one of the following groups, aminovinyl, acylaminovinyl, arylaminovinyl and acylarylaminovinyl groups substituted in the α position to the nitrogen atom and alkyl quaternary salts of heterocyclic nitrogen bases containing a pyridine ring and having one of the following groups, aminovinyl, acylaminovinyl, arylaminovinyl, and acylarylaminovinyl groups substituted in the γ position to the nitrogen atom.

2. The preparation of 1:3:3-trimethylindolylidene-(2)-ethylidenequinaldine by heating 1:-3:3-trimethyl-2-ω-acetanilidovinyl-indoleninium iodide with quinaldine in the presence of an acid binding substance.

MARK BARENT.
JOHN DAVID KENDALL.

---

CERTIFICATE OF CORRECTION.

Patent No. 2,153,931.                                           April 11, 1939.

MARK BARENT, ET AL.

It is hereby certified that error appears in the printed specification of the above numbered patent requiring correction as follows: Page 1, second column, line 16, for "thiadolines" read thiazolines; line 56, at the bottom of the formula, for "+$C_6H_5NHCOCN_3+H_1$" read +$C_6H_5NHCOCH_3+H_1$ ; and that the said Letters Patent should be read with this correction therein that the same may conform to the record of the case in the Patent Office.

Signed and sealed this 13th day of June, A. D. 1939.

Henry Van Arsdale (Seal)                                                Acting Commissioner of Patents.